(12) United States Patent
Matthew

(10) Patent No.: US 6,709,686 B1
(45) Date of Patent: Mar. 23, 2004

(54) POTATO-BASED FOOD PRODUCTS TOLERABLE BY GLUTEN-INTOLERANT INDIVIDUALS AND METHODS OF MAKING AND USING THE SAME

(76) Inventor: Richard G. Matthew, 43 Cadillac Ct., Fond du Lac, WI (US) 54935-6146

( * ) Notice: Subject to any disclaimer, the term of this patent is extended or adjusted under 35 U.S.C. 154(b) by 0 days.

(21) Appl. No.: 10/390,264

(22) Filed: Mar. 17, 2003

(51) Int. Cl.[7] ............................................... A23L 1/216
(52) U.S. Cl. ...................... 426/102; 426/114; 426/128; 426/283; 426/284; 426/512; 426/637
(58) Field of Search ................................. 426/102, 112, 426/113, 114, 128, 282, 283, 284, 302, 512, 523, 637

(56) References Cited

U.S. PATENT DOCUMENTS

| | | | |
|---|---|---|---|
| 3,085,020 A | 4/1963 | Backinger et al. | |
| 3,282,704 A | 11/1966 | Fritzberg | |
| 3,396,036 A | 8/1968 | Liepa | |
| 4,007,292 A | 2/1977 | Shatila et al. | |
| 4,018,898 A | 4/1977 | Tollefson et al. | |
| 4,109,024 A | 8/1978 | Cremer | |
| 4,455,321 A | 6/1984 | Glabe et al. | |
| 4,520,034 A | * 5/1985 | Ishii et al. | 426/282 X |
| 4,528,202 A | 7/1985 | Wang et al. | |
| 4,735,818 A | 4/1988 | Wheatley | |
| 5,204,137 A | 4/1993 | Slimak | |
| 5,366,749 A | 11/1994 | Frazee et al. | |
| 6,251,465 B1 | 6/2001 | Bello et al. | |

FOREIGN PATENT DOCUMENTS

| | | |
|---|---|---|
| EP | 0 296 039 B1 | 9/2003 |
| WO | WO 98/00036 | 1/1998 |
| WO | WO 02/07538 A2 | 1/2002 |

* cited by examiner

*Primary Examiner*—Arthur L. Corbin
(74) *Attorney, Agent, or Firm*—Godfrey & Kahn, S.C.

(57) ABSTRACT

Potato-based food products tolerable by gluten-intolerant individuals and methods of making and using the same. In one aspect, potato-based food products are formed by methods that include the steps of: (a) heating a potato-based ingredient substantially free of gluten to a temperature of from about 130° F. to about 260° F. for sufficient time to allow said potato-based ingredient to be mashed; (b) mashing the potato-based ingredient for a sufficient amount of time for the ingredient to form a dough-like consistency; (c) shaping the potato-based ingredient into shaped pieces; and (d) heating the shaped pieces in an environment at a temperature of about 300° F. to about 500° F. for sufficient time to attain a potato-based food product having a hardened crust. The invention further encompasses filled food articles and packaged foods comprising potato-based food products according to the invention.

19 Claims, 2 Drawing Sheets

US 6,709,686 B1

POTATO-BASED FOOD PRODUCTS TOLERABLE BY GLUTEN-INTOLERANT INDIVIDUALS AND METHODS OF MAKING AND USING THE SAME

FIELD OF THE INVENTION

This invention relates generally to gluten-free food products. In particular, this invention is directed to potato-based food products tolerable by gluten-intolerant individuals.

BACKGROUND OF THE INVENTION

Gluten is a protein commonly found in all foods that contain wheat (including spelt, triticale, and kamut), rye, barley, and possibly oats. In general, gluten is found in almost all grain, pasta, cereal, and the majority of processed foods.

Unfortunately, a large portion of the human population cannot tolerate gluten. One of the leading causes of the inability to tolerate gluten is a disease known as celiac disease. Celiac disease is a digestive disease that destroys the small intestine and interferes with absorption of nutrients from food. Celiac disease is a common genetic disease in Europe and is also extremely widespread in the United States. About 1 in 250 people in Italy and 1 in 300 people in Ireland are afflicted with celiac disease. A recent study in which random blood samples from the Red Cross were tested suggests that as many as 1 in every 250 Americans may have celiac disease.

When people with celiac disease eat foods containing gluten, their immune system responds by damaging the small intestine. Specifically, tiny fingerlike protrusions, called villi, on the lining of the small intestine are lost. Normally, nutrients from food are absorbed into the bloodstream through these villi. Without villi, a person becomes malnourished—regardless of the quantity of the food eaten. Because the body's own immune system causes the damage, celiac disease is considered an autoimmune disorder. However, it is also classified as a disease of malabsorption because nutrients are not absorbed. Celiac disease is also known as celiac sprue, nontropical sprue, and gluten-sensitive enteropathy.

Symptoms of celiac disease may or may not occur solely in the digestive system. As a result, celiac disease is difficult to diagnose. For example, one person might have diarrhea and abdominal pain, while another person has irritability or depression. In fact, irritability is one of the most common symptoms in children. Symptoms of celiac disease may include one or more of the following: recurring abdominal bloating and pain, chronic diarrhea, weight loss, pale foul-smelling stool, unexplained anemia, gas, bone pain, behavior changes, muscle cramps, fatigue, delayed growth, failure to thrive in infants, pain in the joints, seizures, tingling numbness in the legs resulting from nerve damage, pale sores inside the mouth known as aphthus ulcers, painful skin rash known as dermatitis herpetiformis, tooth discoloration or loss of enamel, and missed menstrual periods.

Some people with celiac disease may be asymptomatic. The undamaged part of their small intestine is able to absorb enough nutrients to prevent symptoms. However, people without symptoms are still at risk for complications that can arise from celiac disease. These complications include cancers such as lymphoma and adenocarcinoma, osteoporosis, miscarriage and congenital malformation, short stature, and seizures.

No cure currently exists for celiac disease and no cure is expected in the near future. Unfortunately, the only treatment is to follow a gluten-free diet. However, the gluten-free diet is a lifetime requirement. Eating any gluten, no matter how small an amount, can damage the intestine and this is unfortunately true for anyone with the disease including people who do not have noticeable symptoms. A gluten-free diet means avoiding all foods that contain wheat, rye, barley, and oats. Individuals following such a diet have an incredibly difficult time eating at restaurants, especially fast food restaurants. These people either do not go to restaurants or must avoid eating gluten-containing foods, especially breads, pastas, cereal, and processed foods. As such, a need exists for new gluten-free products. In particular, there is a need for gluten-free products that can be formed into the shape of traditional breads, pastas, rolls, or buns as such items are common table fare in modem dining, especially fast-food style dining. Such need is increasingly evident at restaurants, cafes and the like that serve the general public, many of whom must be exceptionally vigilant about ingesting gluten.

SUMMARY OF THE INVENTION

In certain embodiments, the present invention is directed to methods for making a potato-based food product tolerable by gluten-intolerant individuals. In one embodiment, a method according to the invention comprises the steps of: (a) heating a potato-based ingredient substantially free of gluten to a temperature of from about 130° F. to about 260° F. for sufficient time to allow said potato-based ingredient to be mashed; (b) mashing said potato-based ingredient for a sufficient amount of time for said ingredient to form a dough-like consistency; (c) shaping said composition into shaped pieces; and (d) heating said shaped pieces in an environment at a temperature of about 300° F. to about 500° F. for sufficient time to attain a potato-based food product having a hardened crust.

In a preferred embodiment, the potato-based ingredient to be heated in step (a) is a raw potato stock. Heating of the potato-based ingredient in step (a) may be by way of contacting the potato-based ingredient with steam or hot water.

In another embodiment, step (b) may further include the addition of a gluten-free non-potato-based ingredient during the stirring. Suitable gluten-free non-potato-based ingredients include, but are not limited to, water, milk, salt, seasoning, sour cream, cheese, butter, butter-substitute, cooking oil, or non-potato vegetable matter.

In certain embodiments, the shaped pieces formed during step (c) are shaped into sandwich buns which accommodate, for example, hamburgers, hotdogs or bratwurst. In yet another embodiment, the heating in step (d) is preferably accomplished by baking the shaped pieces for a sufficient amount of time until a hardened crust is formed on a surface of the piece thereby forming an easily handled potato-based food product.

In yet another embodiment of the invention, a method for making a potato-based food product tolerable by gluten-intolerant individuals is provided that comprises the steps of: (a) mixing gluten-free ingredients, said gluten-free ingredients including a potato-based ingredient for a sufficient amount of time for said ingredients to form a dough-like composition; (b) shaping said dough-like composition into shaped pieces; and (c) heating said shaped pieces in an environment at a temperature of about 300° F. to about 500° F. for sufficient time to attain a potato-based food product having a hardened crust.

The potato-based ingredient may be selected from the group consisting of potato flakes, potato buds and cooked potato stock. The potato-based ingredient is preferably a cooked potato stock that was previously heated to a temperature of from about 130° F. to about 260° F. for sufficient time to allow said potato-based ingredient to be mashed.

The invention also encompasses potato-based food products tolerable by gluten-intolerant individuals and formed according to the methods described and claimed herein.

The present invention also includes methods of preparing a food article comprising a food filling and a potato-based food product. Such methods include the steps of placing the food filling on or at least partially in the potato-based food product wherein the potato-based food product is formed according to the methods described and claimed herein. As such, the food articles themselves are within the purview of the present invention.

The invention also encompasses packaged meals comprising at least a food article formed according to the methods described and claimed herein, including (i) packaged meals in ready-to-eat form appropriate for consumption by consumers without further preparation; or (ii) packaged meals in preserved form wherein the packaged meal is provided to consumers to be prepared at the consumer's discretion.

Other objects, features and advantages of the present invention will become apparent after review of the specification, claims and drawings.

DETAILED DESCRIPTION OF THE INVENTION

I. In General

Before the present methods and food products are described, it is understood that this invention is not limited to the particular methodology and materials described, as these may vary. It is also to be understood that the terminology used herein is for the purpose of describing particular embodiments only, and is not intended to limit the scope of the present invention which would be limited only by the appended claims.

It must be noted that as used herein and in the appended claims, the singular forms of "a", "an", and "the" include plural reference unless the context clearly dictates otherwise. Thus, for example, reference to "an ingredient" includes a plurality of such ingredients and equivalents thereof known to those skilled in the art, and so forth.

Unless defined otherwise, all technical terms used herein have the same meanings as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference for the purpose of describing and disclosing the methods and materials which are reported in the publications which might be used in connection with the invention. Nothing herein is to be construed as an admission that the invention is not entitled to antedate such disclosure by virtue of prior invention.

II. The Invention

In certain embodiments, the present invention is directed to methods for making a potato-based food product tolerable by gluten-intolerant individuals. In one embodiment, a method according to the invention comprises the steps of: (a) heating a potato-based ingredient substantially free of gluten to a temperature of from about 130° F. to about 260° F. for sufficient time to allow said potato-based ingredient to be mashed; (b) mashing said potato-based ingredient for a sufficient amount of time for said ingredient to form a dough-like consistency; (c) shaping said composition into shaped pieces; and (d) heating said shaped pieces in an environment at a temperature of about 300° F. to about 500° F. for sufficient time to attain a potato-based food product having a hardened crust.

Figure 1:
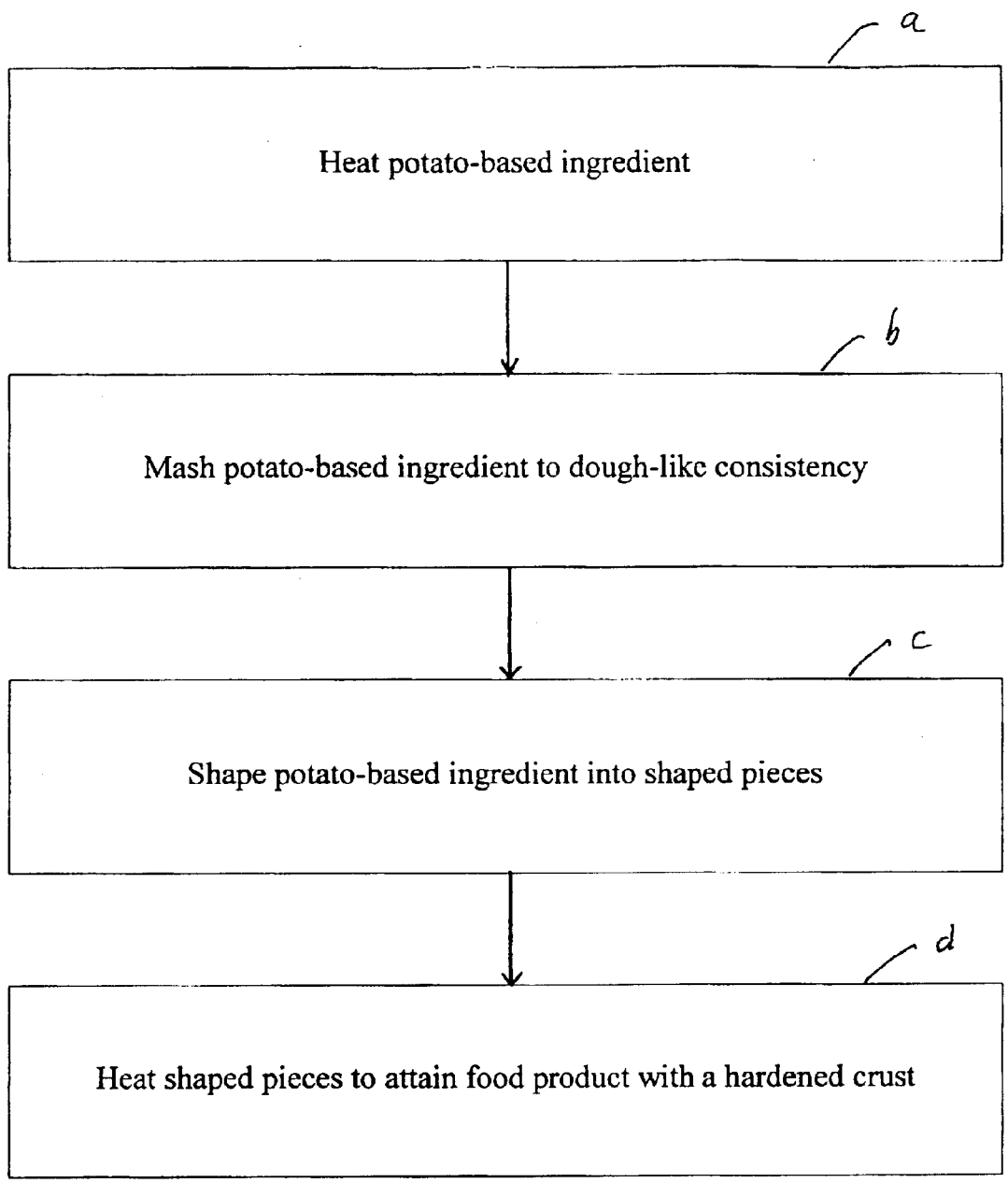
FIG. 1 is a flow chart comprised by boxed text illustrating the steps of a method according to the present invention.

FIG. 1 is a flow chart showing one embodiment of the present invention. In a preferred embodiment, the potato-based ingredient to be heated in step (a) is a raw potato stock. Ordinary russet potatoes or other table stock potatoes might be used. Some of the processing times and temperatures disclosed below may be adjusted to compensate for the use of various table stock potatoes. Raw potatoes are preferably peeled to remove the potato skin. The potatoes are then sliced into slabs. Quarter-inch slabs are preferred.

The potato stock is then subjected to a controlled heating to a temperature of from about 130° F. to about 260° F., preferably from 180° F. to about 230° F., more preferably to between abut 200° F. about 220° F. The heating may be carried out for a time period of between about 5 minutes to about 25 minutes, preferably 10 minutes to 20 minutes, and more preferably 12 to 16 minutes. The exact cooking time will depend upon the starting material and one of ordinary skill in the art may determine the required heating time to adequately cook the potato stock so that, during the subsequent step of mashing, the cooked potato stock may attain a dough-like consistency. Excessively long cooking times will result in a potato stock that is excessively watery and therefor unable to provide the dough-like consistency necessarily required by methods of forming food products according to the invention. Inadequately short cooking times will result in a potato stock that is too lumpy; a smooth, dough-like consistency will not be attained as called for in the invention.

Heating of the potato-based ingredient in step (a) may be by way of contacting the potato-based ingredient with steam over a steam source such as boiling water. Alternatively, the potato-based composition may be heated directly in a heated liquid, preferably water. Following heating, the potato-based composition and heated liquid are separated by straining off the potato-based composition or alternatively, pouring away the heated liquid.

Following heating, the potato-based composition is then mashed for a sufficient time for said composition to form a dough-like consistency. The mashing may be accomplished by, for example, an electric or manually operated beater. However, one of ordinary skill in the art may readily utilize equivalent methods to mash the potato-based composition into a product having a dough-like consistency.

Alternatively, step (b) may further include the addition of a gluten-free non-potato-based ingredient during the mashing. The non-potato-based ingredients may be added during the mashing process or immediately before it. Non-potato-based ingredients arc selected based upon their ability to impart taste, stability, consistency, smoothness, and aroma to the potato-based composition. Though not meant as limitations, representative ingredients may include water, milk, salt, seasoning, sour cream, cheese, butter, butter-substitute, cooking oil, or non-potato vegetable matter. Milk is meant to include all grades milk including skim, low-fat, 1%, 2%, half and half, and whipping cream. Seasoning is meant to be inclusive of all spices regularly available to one of ordinary skill in the art. Suitable additives also include milk-based products other than milk including sour cream, cheese, and butter. Butter equivalents, or butter-substitutes such as margarine are also suitable additives. Cooking oils may also be added including vegetable, canola, peanut, sesame and walnut oil, but, by way of limitation, should include no gluten or be substantially free of gluten. Appropriate ingredients may also include non-potato vegetable matter including, but not limited to, chives, onions, oregano, basil, dill, mint in fresh or dried forms.

Following the heating and mashing and, alternatively, the addition of non-potato-based ingredients, the potato-based composition is shaped into pieces, as described in step (c) of FIG. 1. These pieces are preferably bun-shaped and may vary in accordance with a food filling anticipated to be served in conjunction with certain embodiments of the finished products, (e.g., sandwich buns). For example, hot dogs or bratwurst will require elongated buns. In contrast, hamburgers or chicken breasts may require a circular shaped bun. One of ordinary skill in the art will be able to shape the bun-shaped pieces according to the various food fillings being served. Shaping of the bun-shaped pieces may be accomplished manually or by automated bun-shaping devices known previously in the art. In certain embodiments, no filling is to be inserted in food products according to the invention and the food products are intended to be served alone or with an additional food component applied to the surface of the food product according to the invention. For example, bun- or broad-shaped food products may be formed by the methods described herein for serving with an accompanying dip or spread.

In step (d), the bun-shaped-pieces may be placed on cooking sheets and inserted into an oven for baking at temperatures of about 300° F. to about 500° F. for sufficient time to attain a hardened crust. The exact time and temperature necessary for baking the bun-shaped pieces may be determined by one of ordinary skill in the art so that the products exhibit a hardened crust-like texture. Although these specific embodiments are disclosed as a series of batch steps, it is understood that each embodiment can be practiced in a continuous or semi-continuous process using methods currently available in the food processing industry.

Figure 2:
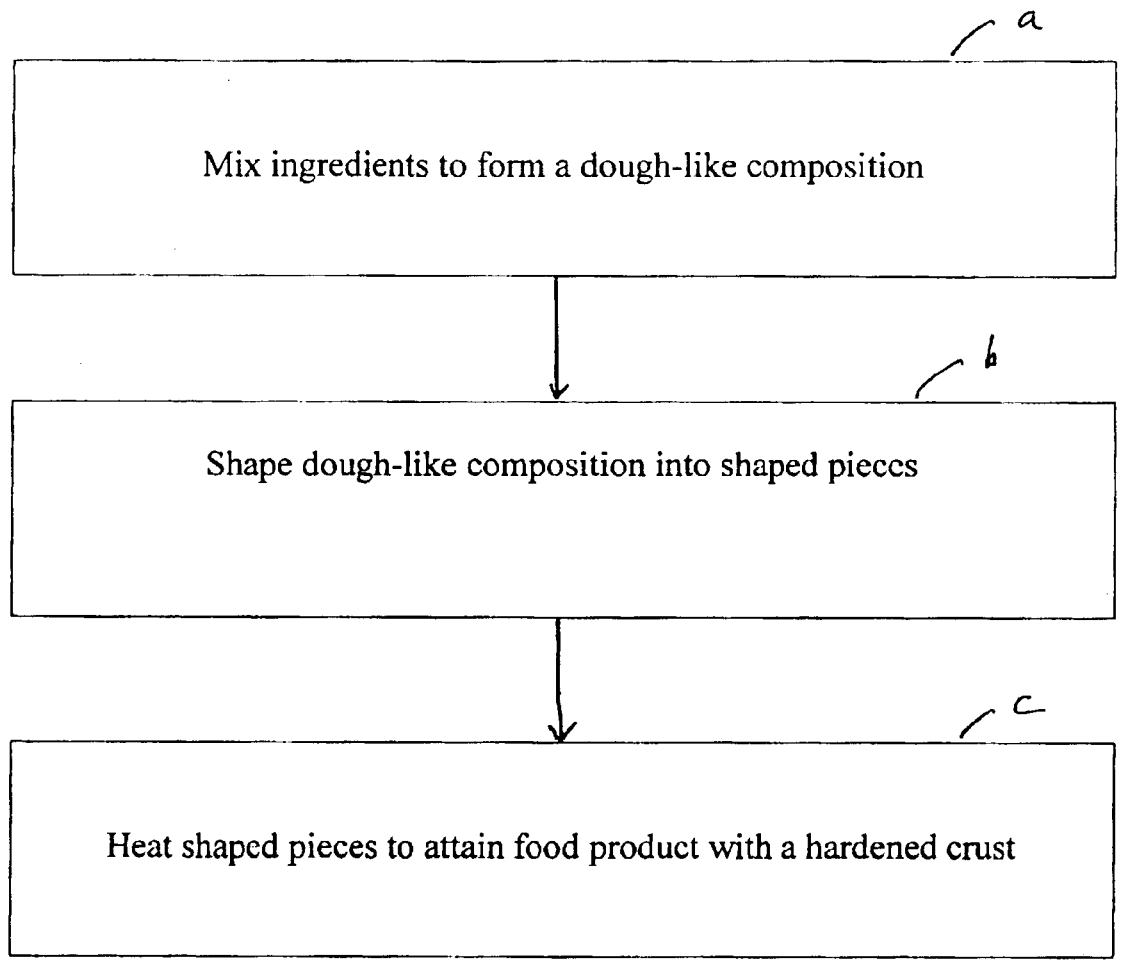
FIG. 2 is a flow chart comprised by boxed text depicting the steps of yet another method according to the present invention.

In another embodiment of the invention illustrated in FIG. 2, a method for making a potato-based food product tolerable by gluten-intolerant individuals is provided that includes the steps of: (a) mixing gluten-free ingredients, said gluten-free ingredients including a potato-based ingredient for a sufficient amount of time for said ingredients to form a dough-like composition; (b) shaping said dough-like composition into shaped pieces; and (c) heating said shaped pieces in an environment at a temperature of about 300° F. to about 500° F. for sufficient time to attain a potato-based food product having a hardened crust.

The potato-based ingredient may be, but is not limited to, potato flakes, potato buds and cooked potato stock. The potato-based ingredient may be a cooked potato stock that was previously heated to a temperature of from about 130° F. to about 260° F. for sufficient time to allow said potato-based ingredient to be mashed. This alternate method may also utilize, preferably, dehydrated potato flakes. The dehydrated potato flakes are re-hydrated and optionally mixed with further ingredients for a sufficient amount of time for the ingredients to form a dough-like composition. Ingredients useful in this method will be substantially free of gluten. Once a dough-like consistency is obtained, the composition is shaped and heated as described above to produce potato-based products having a hardened crust. In all embodiments of the present invention, food products are formed with a hardened crust exterior that is not greasy. A greasy exterior is undesirable in this invention and, therefor, deep frying is not an appropriate technique for the heating steps described and claimed herein as deep frying leaves a food product having a greasy exterior.

The invention also encompasses the potato-based food products formed according to the methods described and claimed herein. In particular, the invention encompasses sandwich buns prepared by the methods described above.

The present invention also includes methods of preparing a food article comprising a food filling or spread and a potato-based food product according to the invention. Such methods include the steps of placing the food filling at least partially in or spreading the spread on the potato-based food product wherein the potato-based food product is formed according to the methods described and claimed herein. As such, the food articles themselves are within the purview of the present invention. One of skill in the art will know standard methods by which fillings and spreads may be applied to the potato-based food product.

The invention also encompasses packaged meals comprising at least a food article or product formed according to the methods described and claimed herein, including (i) packaged meals in ready-to-eat form appropriate for consumption by consumers without further preparation; or (ii) packaged meals in preserved form wherein the packaged meal is provided to consumers to be prepared at the consumer's discretion. The preserved meal may be accompanied with directions to instruct the consumer on how to perform final preparation of the particular food item (e.g., microwave oven directions).

The invention will now be described more specifically by means of the following examples.

III. Example

Example 1

Ten pounds of russet potatoes were peeled, sliced and boiled for 12 minutes. The potatoes were drained and subsequently mashed through a conventional hand blender. During the mashing process, 4 tablespoons of butter, 1 teaspoon of salt, and 2 cups of 2% milk were added to the potatoes. Mashing continued until a homogenous mass having a dough-like consistency was formed. Circle bun-shaped pieces were then formed manually and placed on a baking sheet. The baking sheet was then placed within a preheated oven at 400° F. for 20 minutes. At the end of this time, the bun-shaped pieces exhibited a hardened crust-like texture thus forming potato-based sandwich buns according to the present invention. The bun-shaped pieces were sliced to form upper and lower halves and a cooked hamburger patty was placed between the respective halves to form a ready-to-eat food product.

Example 2

Ten pounds of commercial dehydrated flakes were rehydrated with water to provide potato-based ingredient having a water content of approximately 20% moisture. The potato-based ingredient was then mixed with 4 tablespoons butter, and ½ cup chopped onion and mixed with a conventional kitchen blender until a homogenous mass of ingredients having a dough-like consistency was formed. The resulting dough-like composition was then manually shaped into bun-shaped pieces. The bun-shaped pieces were oblong in longitudinal cross-section and intended for use in holding hot dogs or bratwurst. The bun-shaped pieces were then placed on baking sheets and placed into an oven preheated to 450° F. for 20 minutes to attain a hardened crust-like texture on the bun-shaped pieces. The bun-shaped pieces were sliced to form upper and lower halves and a cooked bratwurst was placed between the respective halves to form a ready-to-eat food product.

Example 3

Food products formed as described in Example 1 were frozen and stored for one week in a household freezer. The food products were then removed from the freezer and immediately placed in a microwave oven for re-heating. The re-heated food product including the hamburger patty was then served hot after removal from the microwave oven.

Example 4

Food products formed as described in Example 2 were frozen and stored for one week in a household freezer. The food products were then removed from the freezer and immediately placed in a microwave oven for re-heating. The re-heated food product including the bratwurst was then served hot after removal from the microwave oven.

While the present invention has been described with particular reference to specific examples, it is not to be limited thereby but reference is to be had to the appended claims for definition of its scope.

What is claimed is:

1. A method for making a potato-based food product tolerable by gluten-intolerant individuals, consisting of the steps of:
   (a) heating a potato-based ingredient substantially free of gluten to a temperature of from about 130° F. to about 260° F. for sufficient time to allow said potato-based ingredient to be mashed;
   (b) mashing said potato-based ingredient and a further gluten-free nonpotato-based ingredient for a sufficient amount of time for said ingredients to form a dough-like consistency;
   (c) shaping said ingredients into shaped pieces; and
   (d) heating said shaped pieces in an environment at a temperature of about 300° F. to about 500° F. for sufficient time to attain a potato-based food product having a hardened crust.

2. A method according to claim 1 wherein said gluten-free nonpotato-based ingredient includes at least one of water, milk, salt, seasoning, sour cream, cheese, butter, butter-substitute, cooling oil, or non-potato vegetable matter.

3. A method according to claim 1 wherein the potato-based ingredient to be heated in step (a) is a raw potato stock.

4. A method according to claim 1 wherein the heating of the potato-based ingredient in step (a) comprises contacting said potato-based ingredient with steam or hot water.

5. A method according to claim 1 wherein said shaped pieces are shaped in the form of sandwich buns.

6. A method according to claim 1 wherein heating in step (d) is accomplished by baking.

7. A potato-based food product tolerable by gluten-intolerant individuals formed according to the method set forth in claim 1.

8. A method for making a potato-based food product tolerable by gluten-intolerant individuals, consisting of the steps of:
   (a) using gluten-free ingredients, said gluten-free ingredients including a potato-based ingredient and a nonpotato-based ingredient, for a sufficient amount of time for said ingredients to form a dough-like composition;
   (b) shaping said dough-like composition into shaped pieces; and
   (c) heating said shaped pieces in an environment at a temperature of about 300° F. to about 500° F. for sufficient time to attain a potato-based food product having a hardened crust.

9. A method according to claim 8 wherein the potato-based ingredient is selected from the group consisting of potato flakes, potato buds and cooked potato stock.

10. A method according to claim 8 wherein the potato-based ingredient is cooked potato stock heated to a temperature of from about 130° F. to about 260° F. for sufficient time to allow said potato-based ingredient to be mashed.

11. A method according to claim 8 wherein said gluten-free nonpotato-based ingredients include at least water, milk, salt, seasoning, sour cream, cheese, butter, butter-substitute, cooking oil, or non-potato vegetable matter.

12. A method according to claim 8 wherein said shaped pieces are shaped in the form of sandwich buns.

13. A potato-based food product tolerable by gluten-intolerant individuals according to the method set forth in claim 8.

14. A method of preparing a food article comprising a food filling and a potato-based food product comprising the step of placing said food filling on or at least partially in said potato-based food product wherein the potato-based food product is formed according to the method of claim 1 or claim 8.

15. A food article prepared according to the method of claim 14.

16. A food article comprising a food filling and a potato-based food product comprising said food filling placed on or at least partially in said potato-based food product wherein the potato-based food product is formed according to the method of claim 1 or claim 8.

17. A packaged meal comprising at least a food article according to claim 16.

18. A packaged meal according to claim 17 wherein said packaged meal is in a ready-to-eat form appropriate for consumption by consumers without further preparation.

19. A packaged meal according to claim 17 wherein said packaged meal is in a preserved form wherein said packaged meal is provided to consumers to be prepared at the consumer's discretion.

* * * * *

UNITED STATES PATENT AND TRADEMARK OFFICE
CERTIFICATE OF CORRECTION

PATENT NO. : 6,709,686 B1
DATED : March 23, 2004
INVENTOR(S) : Richard G. Matthew It is certified that error appears in the above-identified patent and that said Letters Patent is hereby corrected as shown below:

Column 2,
Line 15, the word "modem" should be deleted and replaced with the word -- modern --.

Column 4,
Line 64, the word "arc" should be deleted and replaced with the word -- are --.

Column 5,
Line 34, the word "broad" should be deleted and replaced with the word -- bread --.

Column 7,
Line 39, the word "beating" should be deleted and replaced with the word -- heating --.
Line 56, the word "cooling" should be deleted and replaced with the word -- cooking --.

Column 8,
Line 11, the word "using" should be deleted and replaced with the word -- mixing --.

Signed and Sealed this

Eighth Day of February, 2005

JON W. DUDAS
*Director of the United States Patent and Trademark Office*